Dec. 16, 1952  G. R. ANDERSON, JR  2,622,217
SINGLE-PHASE WINDING
Filed May 6, 1950

INVENTOR.
GORDON R. ANDERSON, JR.
BY: Paul L. Krohn
ATTORNEY.

Patented Dec. 16, 1952

2,622,217

UNITED STATES PATENT OFFICE 2,622,217

SINGLE-PHASE WINDING

Gordon R. Anderson, Jr., Freeport, Ill., assignor to Fairbanks, Morse & Co., Chicago, Ill., a corporation of Illinois Application May 6, 1950, Serial No. 160,547

6 Claims. (Cl. 310—166)

This invention relates to improvements in single phase induction motors, and concerns in particular the provision of lapped or distributed windings in the stator assembly, affording a sinusoidal flux distribution equivalent to that obtained with the heretofore generally prevailing concentric form of single phase windings.

The presently improved distributed or lapped form of single phase winding is designed to avoid the disadvantages inherent in the concentric form, such as the requirement of coils differing in throw or pitch and having long end turns resulting in coils of relatively high resistance, the difficulty in winding concentric coils by machine, and the usual difficulties in applying the coils in the slots of the core. To such end, the present invention provides a two layer distributed winding arrangement for single phase motors, wherein the windings are provided by preformed coils which in the case of the main winding, are of the same size or pitch but differ in number of turns in the several coils. The starting winding of similar construction but having less copper, is here provided to have the same number of turns in each of the coils. The coil turns in the main and starting windings, together with the sizes of wire employed and the arrangement of the main and starting windings in the slots of the core, are so selected and related as to afford coil filling of all of the slots, with each slot containing substantially the same amount of copper. The arrangement as above indicated wherein all the slots are filled with coil sides, is of particular advantage in that it permits more rugged windings and reduces insulation failure from winding creep which heretofore has been found to occur in stator assemblies in which some of the slots are not completely filled with coil sides.

It is the principal object of the invention, therefore, to facilitate single phase motor manufacture and to reduce manufacturing costs by affording a stator assembly having lapped or distributed main and starting windings wherein all the slots are filled and with substantially the same amount of copper, and wherein the assembly characteristics as hereinabove referred to, are such as to permit the use of stator core and frame parts designed for polyphase motors.

The nature of the present invention and the advantages attained thereby will appear readily from the following description of a presently preferred embodiment as illustrated in the accompanying drawing, wherein.

Figure 1:
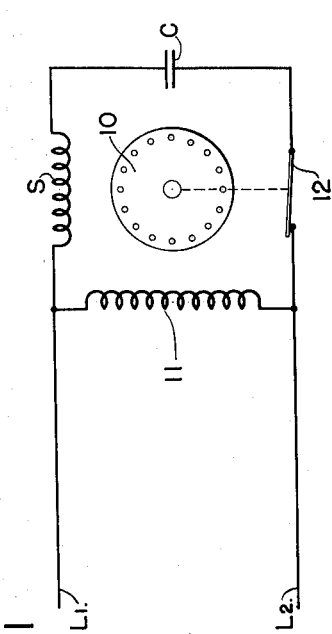
Fig. 1 is a diagrammatic circuit drawing of a single phase, capacitor start motor wherein the main and starting windings are formed and assembled in the stator in accordance with the present invention.

Referring to the drawings, the single phase motor shown in Fig. 1 comprises an induction rotor 10, a main winding 11 across the line conductors L1 and L2, starting winding S in series with a phase shifting condenser C, and a switch 12 controlling circuit connection of the starting winding and condenser in parallel to the main winding 11. As is well understood, the switch 12 which may be made responsive to rotor speed or otherwise suitably controlled in well-known manner, serves to open-circuit the starting winding as motor speed comes up to normal running operation.

For the purpose of present example but without limitation as to any particular single phase motor, the motor here selected for illustration is a one-third H. P., two-pole motor having a normal operating speed of fifteen hundred R. P. M., and wherein the stator core contains thirty-six slots.

Figure 2:
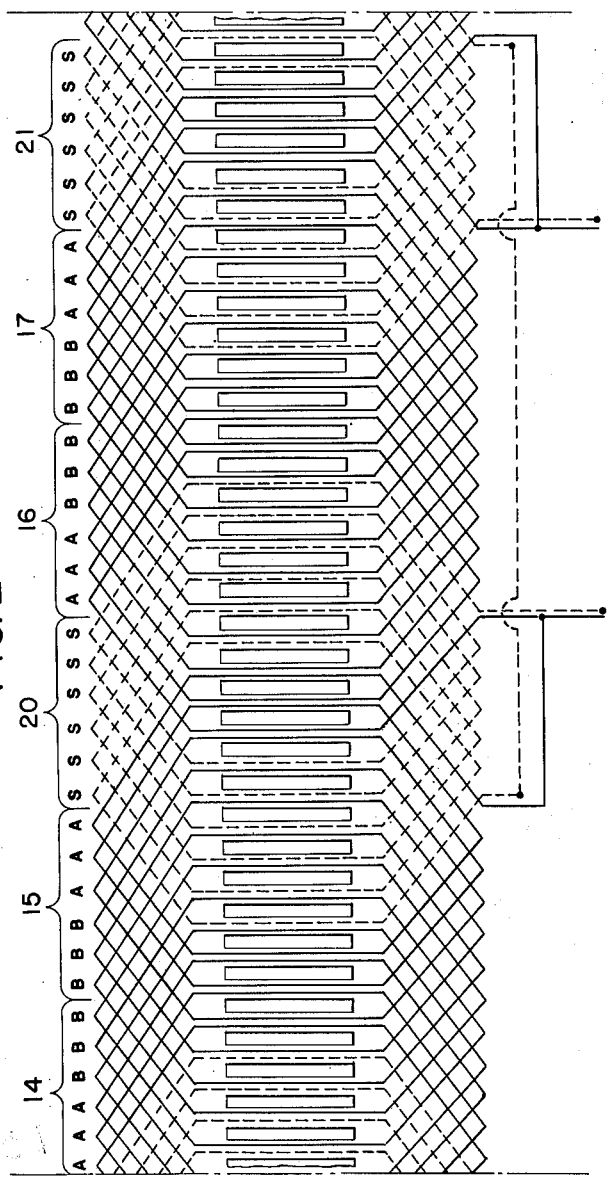
Fig. 2 is a developed diagrammatic representation of the stator slot and winding assembly.

With reference to Fig. 2, presenting a developed view of the stator core slots having the presently improved main and starting windings assembled therein, the main winding is provided by coils A and B and the starting winding by coils S, all in lapped or distributed arrangement in the slots as shown. A two layer winding arrangement is thus provided wherein each slot contains two coil sides filling the slot.

The main winding according to present improvements, is comprised of four sets of coils 14, 15, 16 and 17, wherein the coils of all sets are of the same size or throw. Each coil set contains three A coils having 33 turns of #19 copper wire, and three B coils having 45 turns of #19 copper wire. The coils of the sets are suitably preformed preferably by machine winding, ready for slot insertion in predetermined order hereinafter to be described. The starting winding comprises two sets of coils 20 and 21, these coils having the same size or throw as provided for the coils of the main winding. Each starting winding set contains six coils S wherein each coil is comprised of 44 turns of #22 copper wire. As in the instance of the main winding coils, the coils of the starting winding are preformed, ready for slot installation. Thus, while all the coils A, B and S have the same size or throw, the coils S have the same number of turns, while the coils A and B differ in number of turns, as indicated.

Figure 3:
Fig. 3 illustrates diagrammatically the separately formed main and starting windings arranged in the relative order of application of the windings to the stator core.

The order of coil assembly to the core slots is in accordance with the left to right arrangement of the coil sets presented in Fig. 3. The main winding set 14 is inserted first, starting with the first A coil, the coils A and B being inserted in lapped or distributed manner as shown in Fig. 2. Next, the main winding set 15 is inserted in like manner, but starting with the first B coil. Following coil set 15 is the starting winding set 20 having the coils S lapped-in as shown. Next in lapped adjacence to the set 20, is the main winding set 16 inserted as in the case of the first set 14, and following set 16 is the last main winding set 17. Finally, the second starting winding set 21 is lapped-in, thus completing the stator winding assembly. It will appear then, that each of the 36 core slots contains two coil sides filling the slot.

It will appear further from the distributed winding arrangement of Fig. 2, that in each slot containing a side of an S coil, the other coil side therein is that of a B coil. Thus each such slot contains 44 turns of #22 wire (S coil) and 45 turns of #19 wire (B coil), making a total of 89 turns of #19 and #22 wire. The remaining slots each contain two sides of A coils, or 66 turns of #19 wire. Accordingly, in view of the indicated selection of turns and wire sizes, it may be readily determined therefrom that the amount of copper in each slot having coil sides of S and B coils is substantially the same as the amount of copper in each slot having two A coil sides therein. Hence, the amount of copper is substantially the same in all slots, which is of decided advantage particularly in respect to the uniformity of slot fill. Moreover, the distributed arrangement of the main winding coil sets is such as to attain an approximate sinusoidal flux distribution in motor operation.

While the foregoing example concerns a two-pole single phase motor having thirty-six stator core slots, it is to be understood that the character of distributed starting and main winding arrangement according to the present invention, may be applied readily to motors of more than two poles, and wherein the stator structure provides the same or any other suitable number of winding slots. Moreover, because of the lapped or distributed winding arrangement affording relatively short end turns, single phase motors may be constructed in accordance with the present improvements, utilizing stator core structures designed for polyphase motors.

Having now described and illustrated a present exemplary embodiment of the invention, what is desired to be claimed and secured by Letters Patent is:

1. In a single phase induction motor, a stator assembly comprising a core having winding slots, main and starting windings distributed in the core slots with the coils of the main winding so distributed as to approximate a sinusoidal flux distribution in motor operation, the main winding coils having the same throw and certain thereof having a greater number of coil turns than others, said main winding coils further having its coils formed of copper wire of a predetermined wire size, and said starting winding providing coils having a throw equal to the throw of the main winding coils and each formed of copper wire of a predetermined smaller wire size, the slot distribution of the main and starting winding coils being such that certain of the core slots contain in each thereof, two coil sides of main winding coils of the lesser number of turns, while the remaining core slots contain in each thereof, a coil side of a main winding coil of the greater number of turns and a coil side of a starting winding coil, and further, said predetermined wire size of the main winding coils and the predetermined smaller wire size of the starting winding coils being such that in said slot distribution of the main and starting winding coils, all of the core slots contain substantially the same amount of copper per slot.

2. In a single phase motor, a stator core having winding slots, a main winding having its coils distributed in said core slots such as to provide one coil side in each of a plurality of the slots and two coil sides in and substantially filling each of the remaining slots, the main winding being so distributed as to approximate a sinusoidal flux distribution in motor operation, the coils of the main winding having the same throw and being formed of copper wire of a predetermined wire size, with those coils providing one coil side in each of said plurality of slots having a greater number of turns per coil than the others, and a starting winding providing coils of an equal number of turns per coil and having the same throw as that of the main winding coils, said coils of the starting winding being formed of copper wire of a predetermined wire size less than that of the main winding coils and having the coil sides thereof arranged relative to the said plurality of slots having one main winding coil side in each, such that each such slot contains one side of a starting winding coil which with the side of the main winding coil therein, substantially fills the slot.

3. In a single phase motor, a stator assembly comprising a stator core having winding slots, a main winding provided by first and second groups of multi-turn coils formed of copper wire, and a starting winding provided by a plurality of multi-turn coils formed of copper wire, the coils of the main and starting windings being received in the core slots in lapped distribution therein such that certain of the core slots contain said first group of main coils in an arrangement of two coil sides per slot, while the remaining slots contain said second group of main coils and said starting winding coils in an arrangement providing one main coil side and one starting coil side in each slot thereof, and the wire size and turns per coil being relatively predetermined for the groups of coils of the main winding and the starting winding coils such that in said slot distribution of the coils, the core slots contain the same amount of copper per slot.

4. In a single phase motor, a stator assembly comprising a stator core having winding slots, a main winding provided by first and second groups of multi-turn coils formed of copper wire, and a starting winding provided by a plurality of multi-turn coils formed of copper wire, the coils of the main and starting windings being received in the core slots in lapped distribution therein such that certain of the core slots contain said first group of main coils in an arrangement of two coil sides per slot, while the remaining slots contain said second group of main coils and said starting winding coils in an arrangement providing one main coil side and one starting coil side in each slot thereof, all of said main and starting winding coils having the same throw, and the wire size and turns per coil being relatively predetermined for the groups of coils of the main winding and the starting winding coils such that in said slot distribution of the coils, the core slots contain the same amount of copper per slot with each slot substantially filled by the coil sides therein.

5. In a single phase motor, a stator assembly comprising a stator core having winding slots therein, a distributed single phase winding in the core slots arranged to afford an approximately sinusoidal flux distribution in motor operation, said winding providing coils of the same throw, with certain of the coils having a predetermined number of turns per coil differing from the turns per coil in the remaining coils and being so distributed in certain of the core slots as to provide two coil sides in each such slot substantially filling the slot, said remaining coils being so distributed in the remaining core slots as to provide one coil side in each thereof, and a starting winding having coils of the same number of turns per coil and of a throw equal to that of the main winding coils, said starting winding coils being distributed in said core slots containing one main winding coil side per slot such as to provide one starting winding coil side in each thereof, and the relative number of coil turns in said starting winding coils and said remaining main winding coils being predetermined such that the slots containing one coil side of each thereof, are substantially filled by said coil sides.

6. In a single phase motor, a stator assembly comprising a stator core having winding slots, main and starting windings providing a plurality of coils having the same throw, the main winding coils being distributed in the core slots such that certain of the clots contain two coil sides per slot and the remaining slots contain one coil side per slot, the starting winding coils being distributed only in said remaining core slots, such that each contains one starting winding coil side, those of said main winding coils having two coil sides in said certain slots being formed of copper wire of a predetermined wire size and having a predetermined number of turns per coil such that the two coil sides per slot substantially fill each slot of said certain slots, and the remaining main winding coils and said starting winding coils differing in wire size and number of turns per coil such that each of said remaining core slots is substantially filled by the main winding coil side and the starting winding coil side therein.

GORDON R. ANDERSON, Jr.

REFERENCES CITED

The following references are of record in the file of this patent:

UNITED STATES PATENTS

| Number | Name | Date |
|---|---|---|
| 931,156 | Specht | Aug. 17, 1909 |
| 2,219,702 | Schurch | Oct. 29, 1940 |
| 2,470,663 | Stein et al. | May 17, 1949 |